(12) United States Patent
Moriarity

(10) Patent No.: US 6,273,701 B1
(45) Date of Patent: Aug. 14, 2001

(54) HEATED DIE LIPS FOR CONTROLLING EXTRUDED POLYMER FILM THICKNESSES

(76) Inventor: J. Gregory Moriarity, 11814 180th Ave., NE., Arlington, WA (US) 98223

( * ) Notice: Subject to any disclaimer, the term of this patent is extended or adjusted under 35 U.S.C. 154(b) by 0 days.

(21) Appl. No.: 09/272,293

(22) Filed: Mar. 19, 1999

(51) Int. Cl.[7] .......................... B29C 47/16; B29C 47/86; B29C 47/92
(52) U.S. Cl. ...................... 425/141; 425/379.1; 425/465; 425/466
(58) Field of Search ................................ 425/141, 379.1, 425/465, 466

(56) References Cited

U.S. PATENT DOCUMENTS

| | | |
|---|---|---|
| 3,761,553 | 9/1973 | Richardson . |
| 3,819,775 | 6/1974 | Mules . |
| 3,883,279 | 5/1975 | Heyer .................................. 425/141 |
| 3,901,636 | 8/1975 | Zink et al. ........................... 425/378 |
| 3,920,365 | 11/1975 | Mules .................................. 425/141 |
| 4,332,543 | 6/1982 | Fulton et al. ........................ 425/461 |
| 4,781,562 | 11/1988 | Sano et al. ........................... 425/141 |
| 4,810,179 * | 3/1989 | Cavanagh ............................. 425/141 |
| 4,863,361 * | 9/1989 | Boos .................................... 425/141 |
| 4,871,493 * | 10/1989 | Goto .................................... 425/141 |
| 5,229,140 | 7/1993 | Crass et al. .......................... 425/141 |
| 5,401,454 | 3/1995 | Mendel .............................. 264/176.1 |
| 5,423,668 | 6/1995 | Cloeren ................................ 425/141 |
| 5,487,655 | 1/1996 | Frey et al. ........................... 425/72.2 |

* cited by examiner

*Primary Examiner*—Nam Nguyen
*Assistant Examiner*—Joseph Leyson
(74) *Attorney, Agent, or Firm*—Jacobson Holman, PLLC

(57) ABSTRACT

Lip die structures include thrust developing elements spaced along one lip at first points for flexing those first points toward and away from the other lip and controlled by a thickness monitor spaced downstream along the web being produced from the lip die. First heating elements are carried by the one lip aligned with the thrust developing elements and are controlled by the thickness monitor to selectively heat the first heating elements responsive to monitored decreases in web thickness. Second heating elements are also carried by the first lip intermediate the first heating elements and are controlled by the thickness monitor to actuate, selectively, the second heating elements responsive to monitored decreases in thickness of said web.

6 Claims, 2 Drawing Sheets

HEATED DIE LIPS FOR CONTROLLING EXTRUDED POLYMER FILM THICKNESSES

CROSS-REFERENCE TO RELATED APPLICATIONS

Not Applicable

STATEMENT REGARDING FEDERAL SPONSORED RESEARCH OR DEVELOPMENT

Not Applicable

BACKGROUND OF THE INVENTION

1. Field of the Invention

This invention generally relates to automatic extrusion die constructions, especially for forming generally flat sheet or cast film polymer webs. More specifically, the present invention relates to automatic extrusion die constructions in which a plurality of individual, selectively controllable pressure developing thrust elements is supported from one lip of the die at points spaced longitudinally therealong and with each thrust element operative to apply a variable amount of thrust to the corresponding lip area in order to flex that lip area toward and away from the other lip and thereby selectively narrow or widen the die lip opening for a more uniform extruded resin thickness.

2. Description of Related Art

Current technology for automatic extrusion dies involves the use of either threaded bolts turned by servomotors, or by the use of electric heaters in a heat actuated expandable cartridge assembly in order to mechanically manipulate the flexible lip of a sheet die to accomplish gauge control of polymers. The automatic die works in conjunction with a downstream gauge scanning mechanism which gives a feedback signal via a microprocessor to individually actuate bolts or heat expandable cartridges of the autodie. In order to reduce areas of high gauge, the corresponding servomotors turn down the threaded bolts or apply power to the heat expandable cartridges in order to mechanically close the lip of the die in the corresponding areas in question. In the areas of low gauge the servomotors retract the threaded bolt, or cut off electrical power to the heat expandable lip cartridge to relax mechanical pressure on the die lip and thus allow natural relaxation of the die lip in response to internal pressure of the polymer and the die.

The state of the current technology is indicated by the disclosures of the following patents. U.S. Pat. No. 3,901,636, to Stanley C. Zink et al. discloses a plastic film extrusion apparatus including two melt chambers heated to different temperatures. The two heated chambers are each used to heat the resin of the thermoplastic material extruded through that chamber and the specific temperatures to which the chambers are heated are maintained above and below the temperature of oxidation of the resin of the thermoplastic material extruded through the die. The use of two melt chambers at temperatures below and above the oxidation temperature of the resin allows two webs or films to be extruded from the die with the high temperature film sandwiched between the low temperature film and a substrate, trapping the odor of the high temperature film.

U.S. Pat. No. 4,781,562, to Takayosyhi Sano et al. discloses heat actuated thrust units operatively associated with a die lip. Each thrust unit functions to increase the width of the die slot when the heat actuated thrust unit is activated and to decrease the width of the die slot when the heat actuated thrust unit is deactivated.

U.S. Pat. No. 5,229,140, to Guenther Crass et al. discloses a lip die having mechanical thrust developing structures associated with a flexible lip and also an elongated bar extending longitudinally of the flexible lip including selectively operable heaters spaced along the bar, the bar being adjustably reciprocated along the flexible die lip to achieve uniform heating of the die lip.

U.S. Pat. No. 5,401,454, to Kilian K. Mendel discloses an extrusion die and flow control method incorporating a flow control in the form of a flow diverter which extends transversely across the flow path.

U.S. Pat. No. 5,423,668, to Peter F. Cloeren discloses a thermally controlled lip gap mechanism or adjustment incorporating continuous heating and heat sink sources in an attempt to more quickly adjust a die lip gap or slit as deviation in produced web thickness occurs downstream from the die.

Finally, U.S. Pat. No. 5,487,655, to Detlef Frey et al. discloses an apparatus for producing a spun fiber fleece which insures a highly uniform or homogenous distribution of the mechanical properties described in the web and which allows, in particular, the elimination of detrimental local inhomogeneities.

It is also known in blown film applications having circular dies to use heaters in the air ring which sits atop the blown film die. The air from the air ring is normally employed to cool the bubble of blown film as it is extruded and stretched. The heaters selectively apply heat to the air directed at areas of thicker film thickness as controlled by a down stream gauge scanner. The added heat allows the film to continue to stretch and become thinner than it would without the heated air applied in the thicker film areas.

SUMMARY OF THE INVENTION

The instant invention involves the use of a series of small electrical cartridge heaters preferably embedded in one lip of an extrusion lip die for the purpose of making fine tuned gauge adjustments to the thickness of molten polymers extruded from the die.

More particularly, the instant invention involves the use of the existing autodie technology along with the application of the series of small lower wattage cartridge (rod) heaters in a modified lip design of a flat sheet or cast film die. The current technology stops with the use of the two styles of mechanical lip manipulation described above in connection with the prior art. In accordance with the instant invention involving the provision of lip heaters, the heat is preferably applied directly to the die lip. In areas of low gauge, heat is applied to the lip via a feedback signal from the gauge scanner mechanism. The extra heat, a matter of a few degrees increase, allows some lateral flow of polymer into the hotter areas, as polymers follow the path of least resistance with the additional heat providing the reduction in resistance. The increased polymer flow also increases the die opening in the heated area and additionally increases the web thickness in the desired location.

This new design in accordance with the present invention preferably involves the use of two different wattage heaters, with higher wattage heaters preferably in line with the existing technology mechanical lip manipulation assemblies described earlier. These are commonly set up at one inch intervals. The second and lower wattage heaters are placed also at one inch intervals, but preferably situated on centers at the points halfway between each pair of adjacent higher wattage heaters. Each separate lip heater constitutes a separate control zone, just as each individual mechanical lip manipulation assembly does in existing autodies.

The benefits associated with using these additional lip mounted larger and smaller wattage heaters are multiple. While the prior art servomotor/bolt system has quicker response time than the prior art heater/expandable cartridge system, there are space limitations in some industrial applications where these systems are commonly used. For the heat-expandable cartridge system, the response time is relatively slower and more so on the adjustment where the lip opening/relaxation is required. While both of these existing systems yield good control results, they cannot achieve results which are attainable with the additional use of the lip mounted heaters of the instant invention.

The new heaters in the lip system of the present invention reduce response time as well as allow for a higher degree of point-to-point gauge variation control of the polymer sheet in extrusion. In areas of low gauge, the application of electrical power to the lip heater in line with the mechanical die lip manipulator assembly speeds the flow of polymer into the lip area in question to more quickly force the die lip open and at the same time build-up the low gauge area due to the lateral flow of polymer into the lower gauge area. The smaller wattage lip heaters located halfway between the larger wattage lip heaters allow for greater point-to-point gauge control by enhancing lateral "fill in flow" between the primary mechanical lip manipulation assemblies.

The benefits of the instant invention further include material waste reduction due to increased control response time, as well as the ability to further reduce nominal gauge target due to enhanced point-to-point variation control. In addition, only a slight modification of the die lip geometry is required to allow for insertion of rod heaters into the lip of a new die, so that actual modification of the die lip is relatively inexpensive for a die manufacturer. Furthermore, the system of the instant invention may be retrofitted into existing dies as the rod heaters could still be placed into the existing lip die without necessarily requiring a re-manufacture of the lip die.

Existing control software technology can be very readily expanded for use with the new heaters in the die lip as this mainly requires just the use of more control zone loops.

A still further benefit of the system of the present invention is that there is very little additional cost to operate. The heaters are inexpensive and, since the wattage required is low, the power costs are also very modest. Furthermore, because the added heaters are not mechanical, there is no mechanical assembly maintenance required. Finally, in some applications there are space limitations associated with both existing prior art designs described earlier. There are applications where it is desirable to have the die lips as close as possible to the subsequent processing equipment. The addition of the heaters of the instant invention to the lip of the die enables the die lips to be somewhat more extended than is the case with existing designs to allow for closer placement of die lips to a tight area as the roll gap of a calender roll stack.

It is therefore an object of this invention to provide an improved lip die which will be capable of more closely controlling extruded polymer film thicknesses than is now possible with existing lip die technology.

Another object of this invention is to provide a modified die lip construction in accordance with the preceding object and which may be readily incorporated into newly manufactured die lips and heaters can be readily retrofitted into existing die lips.

A further object of this invention is to provide an improved die lip construction utilizing the addition of small and larger wattage rod heaters which may be readily controlled by slightly modified (expanded) existing control software technology of gauge scanner mechanisms currently used with existing autodies.

Still another object of this invention is to provide a modified lip die in accordance with the preceding objects which will allow die lip extension, if desired, for closer placement of the die lips relative to a "tight" area such as the roll gap of a calender roll stack.

A final object of this invention to be specifically enumerated herein is to provide an improved lip die in accordance with the preceding objects and which will conform to conventional forms of manufacture, be of simple construction and automatic in operation so as to provide a device that will be economically feasible, long lasting and relatively trouble free in operation.

These together with other objects and advantages which will become subsequently apparent in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
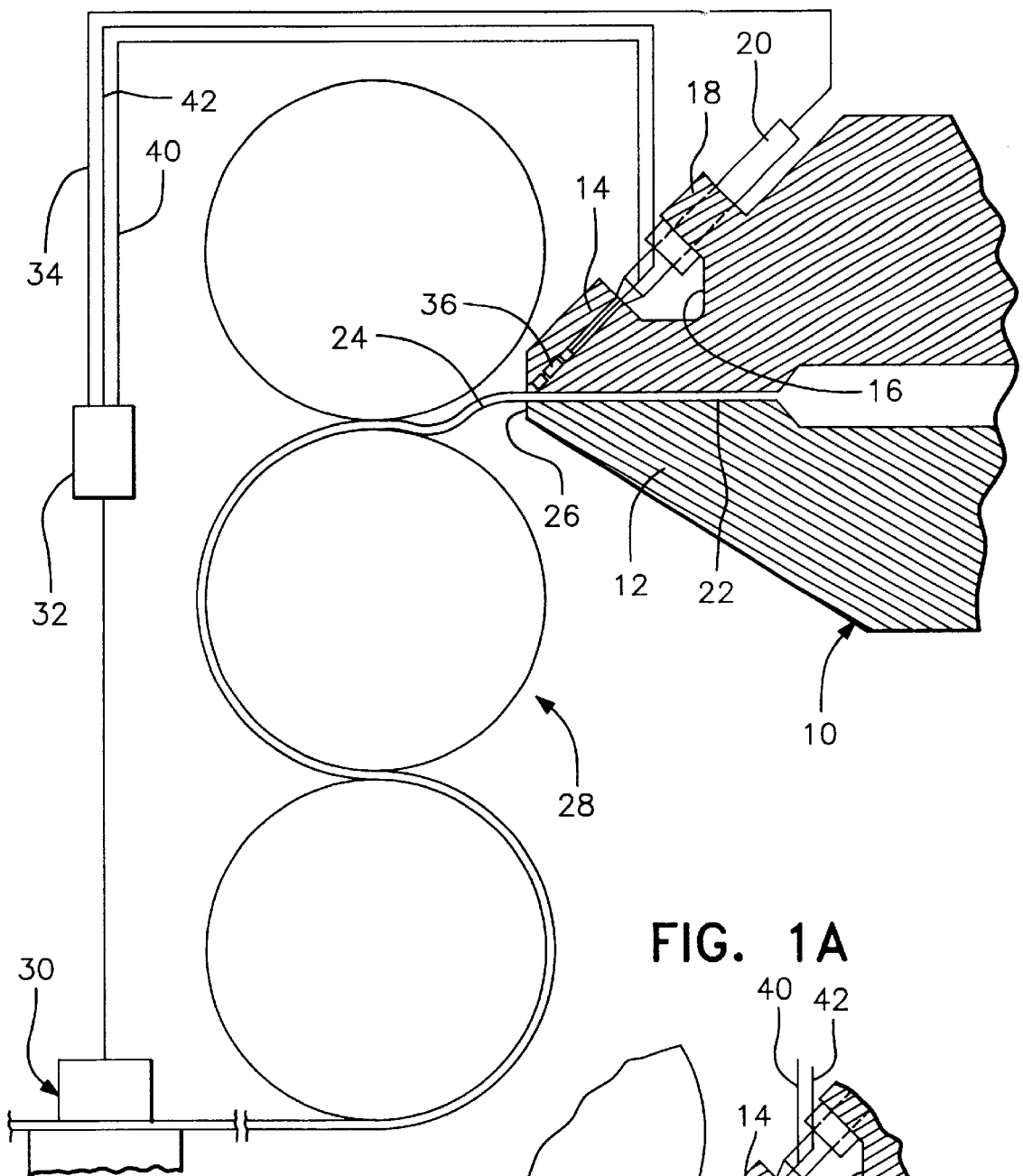
FIG. 1 is a schematic vertical sectional view illustrating a typical form of lip die modified in accordance with the present invention to include two sets of different wattage rod heaters (only one heater of a first set of heaters being shown) in the flexible lip of the die closely adjacent the exit area of the die extrusion slot and with a calender roll stack closely associated with the die lips, a downstream gauge scanning mechanism being illustrated as operably connected to a servomotor/bolt system as well as the different wattage heaters of the instant invention.

Although only two preferred embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

Referring now more specifically to the drawings, and to FIG. 1 in particular, the reference numeral 10 generally designates a basically conventional lip die including a lower lip 12 which is to be considered substantially rigid and an upper lip 14 which includes a longitudinally extending groove defining a flexure zone 16. The flexible or upper lip 14 includes longitudinally spaced mounting bosses 18 from which physical pressure developing thrust elements 20 are adjustably supported. The thrust elements 20 may comprise thermobolts or servomotor controlled threaded bolts or the like.

The lips 12 and 14 define an extrusion opening in the form of a slot or slit 22 therebetween through which heated polymers may be extruded in order to extrude a thin polymer web 24 from the exit opening 26 of the die 10.

The extruded web 24 may be acted upon by a calender roll stack referred to in general by reference numeral 28 in the manner illustrated and a downstream gauge scanning mechanism referred to in general by the reference numeral 30 is provided for monitoring the thickness of the web 24 at position points spaced along the width of the web 24 corresponding to the spacing of the thrust elements 20 along the lip 14. Feedback signals from the gauge scanner mechanism 30 are fed to a computer 32 which in turn supplies electrical current through wires 34 to the thrust elements 20 via the latter servomotor driven threaded bolts or electrically heated thermobolts.

The foregoing is conventional lip die and lip die controlling structure for the production of polymer webs such as the web 24. In some instances, the calender roll stack 28 and die 10 may be mounted for relative horizontal movement toward and away from each other and also for relative vertical shifting.

Figure 1A:
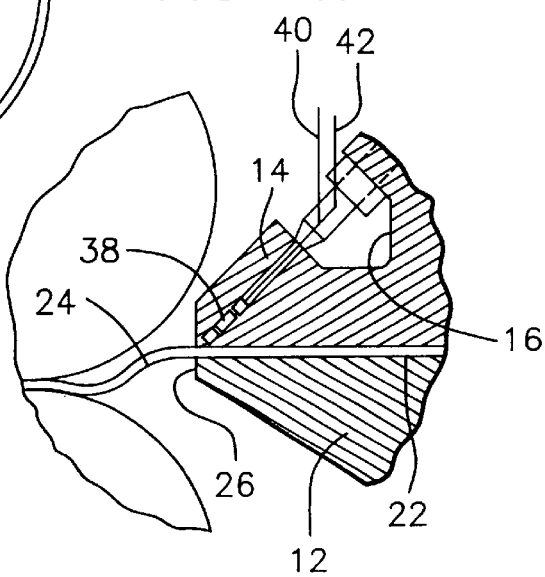
FIG. 1A is a slightly reduced vertical sectional view similar to the upper right-hand portion of FIG. 1 and illustrating one heater of the second set of heaters.

The modified form of the conventional structure incorporating the present invention, as illustrated in FIGS. 1 and 1A, includes a first set of higher wattage rod heaters 36 embedded in the lip 14 in alignment with the thrust elements 20 and a second set of lower wattage rod heaters 38 embedded in the lip 14 adjacent the exit opening 26 at points spaced preferably equidistant between the larger wattage rod heaters 36. Preferably, the larger wattage heaters 36 are 50 watt rod heaters and the lower wattage heaters 38 are 25 watt rod heaters. The rod heaters 36 and 38 are actuated by wires 40 and 42 extending from the computer 32.

In operation, the modified scanner mechanism 30 measures the thickness of the web 24 downstream from the calender roll stack 28 and provides signals to the computer 32. The signals provided to the computer 32 are then processed and the thrust elements 20, whether thermobolts or bolts under the control of servomotors or other similar elements, are actuated in order to maintain at least a coarse uniform thickness of the web 24. In addition, the rod heaters 36 and 38 are actuated in order to achieve finer adjustments in the web thickness. The larger wattage rod heaters 36 registered with the thrust structures 20 are used to achieve slight adjustments in the web thickness achieved by the thrust elements 20 while the lower wattage rod heaters 38, spaced intermediate adjacent rod heaters 36, are used to make fine adjustments in the web thickness intermediate the areas of the web controlled by the thrust elements 20 and the higher wattage rod heaters 36.

The polymer extruded from the die 10 to form the web 24 is maintained, substantially, at a predetermined temperature as it enters the slot or slit 22 to be extruded between the lips 12 and 14. The thrust elements 20 are spaced apart preferably about 1 inch longitudinally along the lip 14. Inasmuch as the rod heaters 36 are preferably aligned with the thrust elements 20, the heaters 36 are spaced apart longitudinally along the lip 14 the same distance as elements 20. Inasmuch as the rod heaters 38 are preferably spaced centrally intermediate adjacent rod heaters 36 and equidistant between the latter, the spacing between the centers of adjacent rod heaters 36 and 38 is generally ½ inch.

If the computer senses a longitudinal zone of the web 24 which is thinner than desired, the rod heater 36 or 38 corresponding to that longitudinal zone of the web 24 is actuated, or has its heat output increased, with the result that extra heat, a matter of a few degrees increase, will allow some lateral flow of polymer into the hotter areas, as polymer being extruded from the die 10 follows the path of least resistance with the additional heat providing the reduction in resistance to polymer flow.

The actuation and control of the rod heaters 36 and 38 along the lip 14 drastically reduce response time as well as provide a higher degree of point-to-point gauge variation control of the polymer sheet in extrusion. In areas of low gauge thickness the application of power to the lip heater in line with the mechanical die lip thrust element speeds the flow of polymer into the lip area in question to more quickly force the die lip open and at the same time build up the low gauge area due to the lateral flow of polymer into the lower gauge area. The smaller wattage rod heaters 38 located halfway between the larger wattage heaters 36 allow for greater point-to-point gauge control by enhancing lateral "fill in flow" between the primary mechanical lip thrust elements 20.

Figure 2:
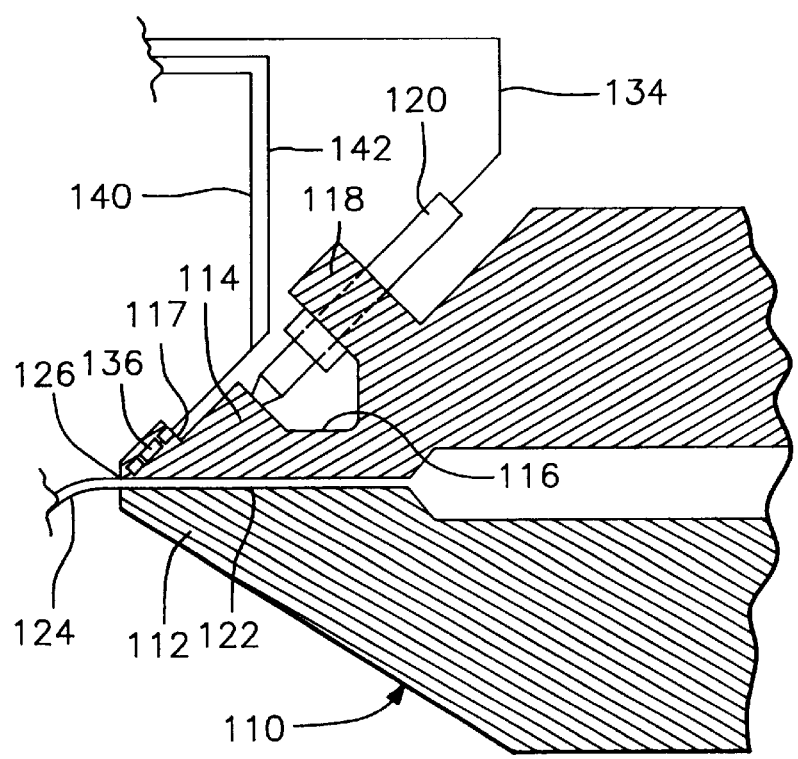
FIG. 2 is a vertical sectional view similar to FIG. 1 but illustrating a modified form of die lip including two parallel flexure zones for the flexible die lip.

A modified form of the present invention is illustrated in FIG. 2. Die 110 corresponds to the die 10 of FIG. 1 in every respect except that the lip 114 of the die 110 includes a second groove or flexure zone 117, in addition to the flexure zone 116 corresponding to the zone 16, extending longitudinally of the lip 114. The various components of the die 110 corresponding to similar components of the die 10 illustrated in FIG. 1 being designated by numerals in the 100's series corresponding to the numerals appearing in FIG. 1.

Figure 3:
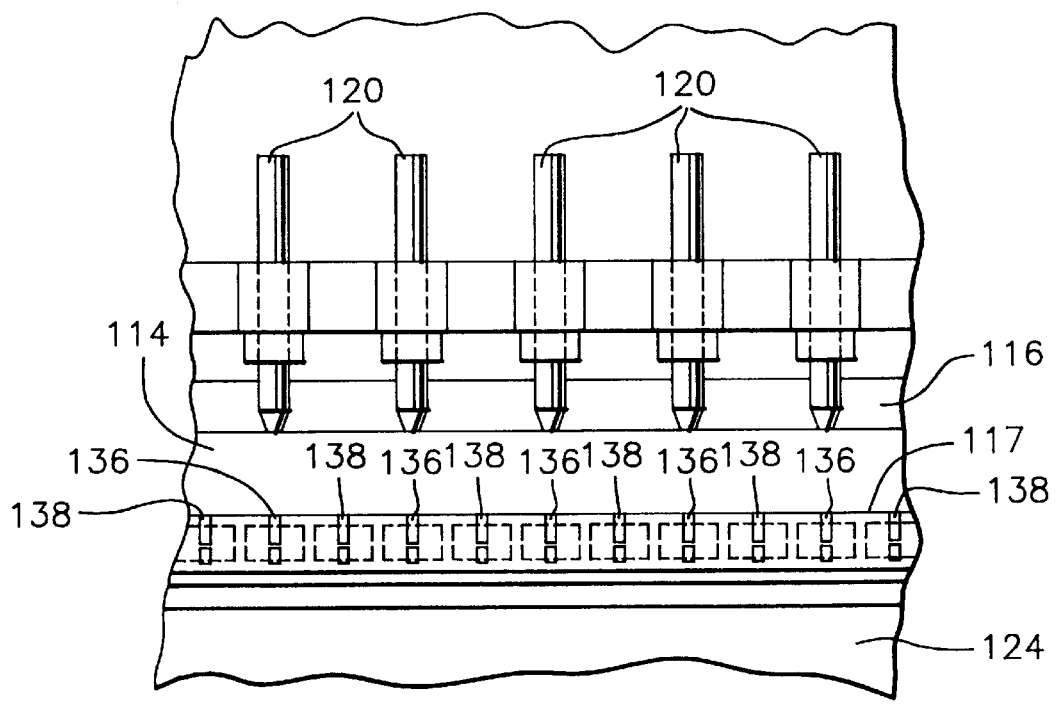
FIG. 3 is a fragmentary elevational view of the assemblage illustrated in FIG. 2, but as seen from an elevated position along a plane extending upward and to the left at 45° from FIG. 2.

As may be seen from FIG. 3, a first set of higher wattage rod heaters 136 are embedded in the lip 114 in alignment with the thrust elements 120 and a second set of lower wattage rod heaters 138 are embedded in the lip 114 adjacent the exit opening 126 at points spaced equidistant between the higher wattage rod heaters 136. Similar to the rod heaters 36 and 38 actuated by wires 40 and 42, the rod heaters 136 and 138 are actuated by corresponding wires 140 and 142, with the thrust elements 120 being actuated by wires 134 corresponding to the wires 34.

The operation of the die 110 is substantially identical to the die 10, with the exception that the second flexure zone 117 in the lip 114 operates in addition to flexure zone 116. The rod heaters 136 and 138 increase or decrease the lip temperature in various longitudinal zones of the web 124 depending upon the signal transmitted based upon measuring the downstream gauge thickness of the extruded web 124. By increasing the temperature, the lateral "fill in flow" is increased which enables a higher pressure of the polymer being extruded to act upon the opposing surfaces of the die lips 112 and 114 in the area of higher temperature. This causes a very slight additional flexure in the flexure zone 117 of the die lip 114 in the affected area to extrude more polymer therethrough and thus increase the extruded web gauge. Since the rod heaters 136 and 138 operate in a separate flexure zone 117 in the FIGS. 2–3 embodiment, closely adjacent the exit 126, this is an advantage of the die lip 114 over the die lip 14.

While heaters 36 and 38 in die 10 and heaters 136 and 138 in die 110 are illustrated in the drawings and described herein as rod heaters, other type heaters could be used at spaced locations along die lips 14 and 114, respectively. Similarly, while higher and lower wattage rod heaters are preferred with the wattage ratio preferably about 2:1, and 50 watts and 25 watts, respectively, most preferred, single sized heaters could be employed at selected locations along the die lip to be heated in accordance with the present invention. Such selected locations also do not have to coincide with the thrust elements 20 and 120 so long as the locations are coordinated with the gauge monitoring locations for activating and deactivating the appropriate heating element or elements.

Further, while the generally 45° positioning of the heaters 36 and 38 in the upper lip 14, as well as the similar mounting of the heaters 136 and 138 in the lip 114, enable the tip dies 10 and 110 to be positioned with the exit openings 26 and 126 closely adjacent the pinch areas between the upper two rolls of the corresponding calendar roll stack, the heaters 36, 38, 136 and 138 may be disposed at other angles, including vertically, or even oppositely inclined, if desired.

Still further, the use of the heaters in the die lip to control the gauge distribution of polymers extruded from flat sheet or film dies may for certain applications also be used as a "stand alone control", exclusive of any mechanical assemblies discussed above as part of the prior art. Thus, the heaters 36, 38, 136 and 138 may be used in conjunction with appropriate controls and gauge scanner mechanism without any thrust elements 20 or 120 as disclosed herein. The use of the heaters 36, 38, 136 and 138 in the die lip also can apply to any flat extrusion die, whether in a sheet application associated with calendar rolls, or in a cast film application in association with a single chill roll.

Moreover, the use of the heaters in the die lip to control the distribution of polymers extruded from the die in accordance with the present invention may also be employed in other extrusion processes, with a variation in the placement of the heaters in the lip according to the type of die in question. For example in the case of blown film dies, the heaters would be placed in a circular arrangement around the outer (or even the inner) section of the annular blown film die adjacent the die lip. In this arrangement, heat applied to the die lip via a feedback signal from the gauge scanner mechanism would allow some lateral flow of polymer into the heated areas, as the polymer follows the path of least resistance with the additional heat providing the reduction in resistance. The increased polymer flow would not increase the die opening in the heated area but would increase the web thickness in the desired location.

In addition, the foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A lip die structure including a pair of elongated, laterally spaced lips defining an extrusion slot therebetween having an exit opening from which to extrude molten resin into a web, said die structure including a plurality of thrust elements spaced longitudinally along one of said lips operative to flex said one lip toward and away from the other lip at spaced locations, a measuring component continuously monitoring the thickness of said web and being operative to selectively actuate said thrust elements to flex said one lip toward and away from said other lip selectively at said spaced locations responsive to increases and decreases, respectively, of monitored thickness of said web at points spaced thereacross in alignment with said spaced locations, and a plurality of heating elements longitudinally spaced along said one lip adjacent said exit opening for selectively heating said one lip at selected points spaced therealong, said plurality of heating elements including first and second heating elements, said first heating elements being at selected points in alignment with the spaced locations for flexing said one lip by said thrust elements and said second heating elements being at points spaced between said first heating elements, said measuring component also being operative to selectively actuate and deactuate any of said heating elements responsive to decreases and increases, respectively, of monitored thickness of said web at points spaced thereacross in alignment with said selected points.

2. The die structure of claim 1, wherein said first and second heating elements respectively define a first and second set of thermoenergy sources, said first set being of higher thermoenergy than said second set, said thermoenergy sources of said second set being interposed between adjacent thermoenergy sources of said first set longitudinally along said one lip.

3. The die structure of claim 2, wherein said thermoenergy sources of said first set a re generally aligned in planes normal to the longitudinal extent of said lips with said thrust elements, and said thermoenergy sources of said second set are spaced centrally intermediate said planes.

4. The die structure of claim 2, wherein said thermoenergy sources of said first set each are generally equal to twice the thermoenergy source of each of said thermoenergy sources of said second set.

5. A lip die structure including a pair of laterally spaced lips defining an extrusion slot therebetween having an exit opening from which to extrude continuous molten resin, said die structure including a plurality of thrust elements spaced along one of said die lips to mechanically flex said one lip toward and away from the other said lip at selected first points along said one die lips a plurality of heating elements including first and second heating elements spaced along said one die lip adjacent said exit opening, said first heating elements being at selected points substantially in alignment with said first points and said second heating elements being at points spaced between said first heating elements, a measuring component continuously monitoring the thickness of said extruded resin at points downstream from said exit opening which are spaced to correspond to said first points, said measuring component being operative to selectively actuate and deactuate said heating elements responsive to decreases and increases, respectively, of monitored thickness of said extruded resin at said points downstream, said actuation of said selected heating elements causing lateral flow of said resin into areas adjacent said activated heaters.

6. The die structure of claim 5, wherein said thrust elements mechanically flex said first points toward and away from correspondingly spaced points along the other lip based upon signals from said measuring component monitoring variations of the thickness of said extruded resin.

* * * * *